United States Patent Office 3,247,207
Patented Apr. 19, 1966

3,247,207
NEW METHODS OF PREPARATION OF COMPOUNDS OF THE VINYL-ANTHRAQUINONE GROUP AND INTERMEDIATES FOR SUCH PREPARATIONS
André Etienne, Paris, Georges Arditti, Montrouge, Seine, and Alexandre Chmelevsky, Paris, France, assignors to L'Air Liquide, Societe Anonyme pour l'Etude et l'Exploitation des Procedes Georges Claude
No Drawing. Filed May 31, 1963, Ser. No. 284,360
Claims priority, application France, June 14, 1962, 900,680, Patent 1,336,713
12 Claims. (Cl. 260—272)

This invention essentially concerns the preparation of 2-vinyl-anthraquinone from 2-ethyl-anthraquinone or homologs thereof, as well as the preparation of other derivatives of the same vinyl-anthraquinone series, notably of 6-vinyl-1,2,3,4-tetrahydroanthraquinone.

Vinyl-anthraquinones have interesting industrial applications owing to the simultaneous presence in their molecules of vinyl and quinone functional groups. They thus give through polymerization polyvinylanthraquinones, which can be used as electron-exchange resins; whether in the solid state or dissolved in a suitable solvent, such polymers can be used for successive reduction and reoxidation reactions, the latter being accompanied by the production of hydrogen peroxide, as described in French Patent No. 1,290,837 of December 23, 1960, in the name of the applicant.

Of the two isomer vinyl-anthraquinones, alpha and beta, the 2-vinyl-anthraquinone is the more readily accessible. It was already obtained by one of the conventional methods of preparation of aromatic derivatives, i.e. through decarboxylation of 2-anthraquinonyl acrylic acid, according to the method defined by A. Etienne, G. Izoret and F. Moritz, Comptes Rendues 249, 708 (1959). This acid is prepared through Doebner condensation between formyl-anthraquinone and malonic acid. 2-formyl-anthraquinone is prepared from 2-methyl-anthraquinone, the basic raw material of this synthesis.

It was also suggested to prepare 2-vinyl-anthraquinone through dehydration of 2-(1-hydroxyethyl)anthraquinone, by melting with an alkaline bisulphate, according to the method described by G. Manecke and W. Stork, Chemische Berichte, December 1961 (pp. 3239–3250).

This invention concerns other methods for the production of 2-vinyl-anthraquinone, in which the starting material is 2-ethyl-anthraquinone.

The formula of the compounds, with their reference numbers, are shown in the table at the end of this specification.

The simplest and most direct method for the manufacture of 2-vinyl-anthraquinone (Ib) according to the invention is characterised by the dehydrogenation, at high temperature, of 2-ethyl-anthraquinone (Ia) in the state of vapour, preferably in a stream of inert gas, through passage on a bed of catalyst, e.g. palladium on asbestos. The dehydrogenation of 2-ethyl-anthraquinone is effected in the neighborhood of 600° C. Merely heating 2-ethyl-anthraquinone in an inert atmosphere gives complex and carbonaceous pyrogenation products. To obtain 2-vinyl-anthraquinone, the vapours of the readily sublimable reactant, diluted in an inert gas such as nitrogen or carbon dioxide, must be passed over a dehydrogenation or hydrogenation catalyst. When the flow rate of the vapours is not too high, dehydrogenation is complete, and 2-vinyl-anthraquinone is collected as crystals.

Among the various catalysts or contact masses, such as platinum or palladium on various carriers (alumina, silica gel, activated carbon, asbestos), the one giving the best results is asbestos with 10% palladium. The great advantage of this catalyst is its easy regeneration through mere roasting in air, which is enough to eliminate the undesirable pyrogenation products.

The second method of preparation of 2-vinyl-anthraquinone according to the invention is characterised by the pyrolysis, at elevated temperature and under vacuum, of a halide of a quaternary ammonium base containing the 1-(2'-anthraquinonyl)ethyl group, preferably a halide of 1-(2'-anthraquinonyl)ethyl-pyridinium, and by the isolation of the desired compound e.g. by extraction with an alcohol.

This method consists in using the secondary chloro (Ie) or bromo (If) derivative of 2-ethyl-anthraquinone. The direct dehydrohalogenation of either halogen derivative into 2-vinyl-anthraquinone is not easy. However, the pyrolysis of the quaternary pyridinium salt of either halogen derivative, especially of the bromide, gives a good yield of 2-vinyl-anthraquinone, with the corresponding pyridinium halide.

The pyrolysis of 1-(2'-anthraquinonyl)ethyl pyridinium bromide (Ih), under about 15 mm. Hg at 260° C., gives a mixture of pyridinium bromide and 2-vinyl-anthraquinone. Pyridinium bromide is eliminated through water washing, and 2-vinyl-anthraquinone is isolated through extraction with boiling ethyl alcohol.

This invention also concerns, as novel commercial products, 1-(2'-anthraquinonyl)ethyl pyridinium chloride (Ig) and 1-(2'-anthraquinonyl)ethyl pyridinium bromide (Ih), used as intermediates in the preparation of 2-vinyl-anthraquinone through pyrolysis, and respectively obtained from 2-(1'-chloroethyl)anthraquinone (Ie) and from 2-(1'-bromoethyl)anthraquinone (If). According to the invention, 2-(1'-chloroethyl)anthraquinone can be obtained through two different routes.

The first method is characterised by the treatment of the warm solution of 2-ethyl-anthraquinone in an inert solvent with a stream of chlorine, in the presence of a free-radical generator, preferably of azo-di-isobutyronitrile.

The chlorination of 2-ethyl-anthraquinone is readily effected in a solvent such as chlorobenzene, preferably maintained at about 110° C., through the passage of an excess stream of chlorine. When the amount of chlorine spent reaches 5 moles per mole 2-ethyl-anthraquinone used, the reaction may be considered as completed. The reaction product is a mixture of monochloro and dichloro derivatives; the monochloro derivative, in greater amount, is extracted with methanol.

The second method of preparation of 2-(1'-chloroethyl)anthraquinone (Ie) according to the invention is characterised by the treatment of dissolved 2-ethyl-anthraquinone, preferably in boiling carbon tetrachloride, with sulphuryl chloride, in the presence of a free radical generator such as azo-di-isobutyronitrile.

2-(1'-bromoethyl)anthraquinone (If) is obtained even more easily than the corresponding chloro derivative by a new method of preparation, characterised by the direct bromination of a solution in a halogen carbon derivative, preferably in boiling carbon tetrachloride.

The above halogen derivatives of 2-ethyl-anthraquinone readily give quaternary ammonium compounds with tertiary bases. Thus, in the presence of excess boiling pyridine, they give respectively 1-(2'-anthraquinonyl)-ethyl pyridinium chloride and bromide.

The invention also concerns the preparation of 2-(1'-hydroxyethyl)anthraquinone (Id), the dehydration of which gives 2-vinyl-anthraquinone. This compound can be obtained in two different ways.

The new methods used are characterised by the dehydrogenation of 6-(1'-hydroxyethyl)-1,2,3,4-tetrahydro-anthraquinone (IIb) dissolved in a solvent such as boiling glycol, in the presence of a catalyst, preferably of palladium on activated carbon, or by the hydrolysis of the above chloro or bromo derivative of 2-ethyl-anthraquinone, dissolved in a strongly polar solvent, with an alkaline bicarbonate.

According to the invention, the methylene group of 2-ethyl-anthraquinone can be oxidized by chromic acid in acetic acid at room temperature, which gives a ketone: 2-acetyl-anthroquinone (Ic); this compound, when hydrogenated in the presence of a catalyst, gives several reactions according to the nature of the catalyst and of the solvent used.

Hydrogenation at room temperature and pressure, in the presence of palladium on alumina, in benzene or alcohol, is very mild and gives the corresponding hydroquinone, i.e. 2-acetyl-anthrahydroquinone; the latter is readily oxidized in the presence of air, like all anthrahydroquinones, and gives the initial product, 2-acetyl-anthraquinone.

Hydrogenation at room temperature and pressure, in the presence of Raney nickel, of 2-acetyl-anthraquinone dissolved in dioxane can be far more complete. The conversion of 2-acetyl-anthraquinone, followed by the measurement of the amount of hydrogen absorbed, gives successively: the reduction of the quinone function to the hydroquinone, through the fixation of 1 mole hydrogen, then the tetrahydrogenation of the unsubstituted aromatic cycle through the fixation of 2 moles hydrogen, and finally the reduction of the ketone function to the alcohol through the fixation of a new mole hydrogen. This three-stage hydrogenation gives successively: 2-acetyl-anthrahydroquinone, 6-acetyl - 1,2,3,4 - tetrahydroanthrahydroquinone (IIIa), and 6-(1'-hydroxyethyl)-1,2,3,4-tetrahydroanthrahydroquinone (IIIb).

All those hydroquinone derivatives are unstable in air, and are speedily reoxidized into the corresponding anthraquinones, with hydrogen peroxide formation: there are thus obtained 2-acetyl-anthraquinone (Ic), 6-acetyl-1,2,3,4-tetrahydroanthraquinone (IIa), and a novel compound according to the invention: 6-(1'-hydroxyethyl)-1,2,3,4-tetrahydroanthraquinone (IIb).

6-acetyl-1,2,3,4-tetrahydroanthraquinone (IIa) seems especially useful for preparation of hydrogen peroxide from anthraquinones.

6-vinyl-1,2,3,4-tetrahydroanthraquinone (IIc) is a novel compound: its method of preparation is characterized by the dehydration under vacuum of 6-(1'-hydroxyethyl)-1,2,3,4-tetrahydroanthraquinone (IIb) through melting with an alkaline bisulphate in the presence of an inhibitor, preferably of hydroquinone. The dehydration is preferably effected in the neighbourhood of 200° C., under 1 to 2 mm. Hg vacuum, which give almost pure 6-vinyl-1,2,3,4-tetrahydroanthraquinone (IIc).

As non-limitative examples, the procedures for the preparation of the various compounds according to the invention are given hereafter.

EXAMPLE I 2-(1'-chloroethyl)anthraquinone (A) PREPARATION WITH CHLORINE

An excess stream of dry chlorine is slowly passed through a solution of 100 parts-2-ethyl-anthraquinone (Ia) and 2.5 parts azo-di-isobutyronitrile in 1100 parts chlorobenzene, held at 110° C. When the amount of chlorine spent is 5 moles per mole-2-ethyl-anthraquinone used, the reaction is considered as completed. The excess chlorine is driven away by a stream of air and the solvent is evaporated under vacuum. The solid is extracted with petroleum ether to eliminate the unreacted 2-ethyl-anthraquinone. 2-(1'-chloroethyl)anthraquinone is extracted with methanol from the residue, which is now made of a mixture of monohalogen and dihalogen derivatives; the solvent is evaporated and the crude product is recrystallized from ethanol, hence yellow flakes, M.P.$_{inst}$=143° C. Amount obtained: 43 parts (yield 38%).

(B) PREPARATION WITH SULPHURYL CHLORIDE

A solution of 100 parts 2-ethyl anthraquinone (Ia), 2 parts azo-di-isobutyronitrile and 1250 parts sulphuryl chloride in 1200 parts carbon tetrachloride is rapidly heated to the boiling point. When the reaction is over (ca. 30 minutes), the mixture is cooled and 3200 parts petroleum ether are added. The precipitate formed is washed several times with petroleum ether and recrystallized from ethanol, hence yellow flakes, M.P.$_{inst}$=137° C. Amount obtained: 63 parts (yield 55%).

EXAMPLE II 2-(1'-bromoethyl)anthraquinone (If)

Into a boling solution of 100 parts 2-ethyl-anthraquinone (Ia) in 280 parts carbon tetrachloride is introduced very progressively (5 hours) a solution of 71 parts bromine in 360 parts carbon tetrachloride. The mixture is then refluxed for a further 15 hours, after which the solvent and excess bromine are eliminated through evaporation. The solid residue is washed with petroleum ether, then recrystallized in a 75/25 ethanol-benzene mixture, hence yellow flakes, M.P.$_{inst}$=155° C. Amount obtained: 120 parts (yield 90%).

EXAMPLE III 1-(2'-anthaquinonyl)ethyl pyridinium chloride (Ig)

A solution of 100 parts 2-(1'-chloroethyl)anthraquinone (Ie) in 245 parts pyridine is heated to boiling point. After 25 minutes refluxing, the medium sets to a solid mass. It is then cooled, and 35 parts petroleum ether are added: the insoluble residue is filtered and washed with petroleum ether until complete elimination of the pyridine, then recrystallized from ethanol, hence beige needles, M.P.$_{inst}$=167° C. Amount obtained: 103 parts (yield 79%).

EXAMPLE IV 1-(2'-anthraquinonyl)ethyl pyridinium bromide (Ih)

Through refluxing of a solution of 100 parts 2-(1'-bromoethyl-anthraquinone (If) in 300 parts, pyridine, there forms very soon (3 minutes) an abundant precipitate of pure product, with quantitative yield. Yellow needles, M.P.$_{inst}$=243° C.

EXAMPLE V 2-acetyl-anthraquinone (Ic)

To a cold solution of 100 parts 2-ethyl-anthraquinone (Ia) in 2100 parts acetic acid are added in small portions, with stirring, 150 parts chromic acid. The mixture is then stirred for 15 hours at room temperature. The thick mass is poured into a large excess of water: there forms a precipitate which is filtered, washed with water, dried and recrystallized from ethanol, hence yellow flakes, M.P.$_{inst}$=144° C. Amount obtained: 68 parts (yield 64%).

EXAMPLE VI 6-acetyl-1,2,3,4-tetrahydroanthraquinone (IIa)

A solution of 100 parts 2-acetyl-anthraquinone (Ic) in 1000 parts dioxane is hydrogenated at room temperature and normal pressure, with good stirring, in the presence of 100 parts pure Raney nickel. The hydrogenation is stopped when the volume of hydrogen absorbed reaches 3 moles for 1 mole 2-acetyl-anthraquinone used, which corresponds to the formation of 6-acetyl-1,2,3,4-tetrahydroanthraquinone. The catalyst is filtered off and a stream of air or oxygen is bubbled through the dioxane solution, so as to convert the hydroquinone into the quinone. After complete reoxidation, the solution is poured into a large excess of water: there forms a precipitate which is filtered, washed with water, dried and recrystallized from ethanol, hence yellow needles, M.P.$_{inst}$=170°–171° C. Amount obtained: 72 parts (yield 71%).

EXAMPLE VII

6-(1'-hydroxyethyl)-1,2,3,4-tetrahydroanthraquinone (IIb)

The preparation is effected as in the preceding example, but the hydrogenation is stopped when the volume of hydrogen absorbed reaches 4 moles for 1 mole 2-acetylanthraquinone (Ic) used, which corresponds to the formation of 6-(1'-hydroxyethyl)-1,2,3,4-tetrahydroanthraquinone (IIIb). The catalyst is filtered off and a stream of air or oxygen is bubbled through the dioxane solution, to convert the hydroquinone into the quinone. After complete reoxidation, the solution is poured into a large excess of water, and the precipitate is filtered and washed with water, hence 82 parts of crude 6-(1'-hydroxyethyl)-1,2,3,4 - tetrahydroanthraquinone (yield 80%). The crude product may be used for further operations. Recrystallization from methanol gives 68 parts pure product (yellow needles, M.P.$_{inst}$=194°–195° C.). Yield 67%.

EXAMPLE VIII

2-(1'-hydroxyethyl)anthraquinone (Id)

A solution of 100 parts 6-(1'-hydroxyethyl)-1,2,3,4-tetrahydraoanthraquinone (IIb) in 500 parts ethylene glycol, containing 100 parts suspended actviated carbon carrying 10% palladium, is refluxed for 2 hours. After cooling and separation of the catalyst, the solution is poured into a large volume of water: there forms a precipitate which is washed with water and recrystallized from 50/50 methanol-water, hence 80 parts pure product (colourless needles), M.P.$_{inst}$=115° C. Yield 81%.

EXAMPLE IX

2-vinyl-anthraquinone (Ib)

(A) PREPARATION THROUGH DEHYDROGENATION OF 2-ETHYL-ANTHRAQUINONE (Ia)

A stream of inert gas (nitrogen or carbon dioxide) containing vapours of 2-ethyl-anthraquinone (Ia) is sent through a bed of asbestos carrying 10% palladium, maintained at 600° C., with a flow rate of 1.20 metre per minute. Essentially pure crystals of 2-vinyl-anthraquinone are collected at the outlet of the reactor. Recrystallization from ethanol gives the pure product as yellow needles, M.P.$_{inst}$=171°–172° C. Amount obtained: 63 parts (yield 63%).

(B) PREPARATION THROUGH DECOMPOSITION OF 1-(2' - ANTHRAQUINONYL)ETHYL PYRIDINIUM BROMIDE (Ih)

100 parts 1-(2'-anthraquinonyl)ethyl pyridinium bromide are pyrolyzed at 260° C. under 15 mm. Hg, hence a mixture of pyridinium bromide and 2-vinyl-anthraquinone, which is washed with water, then extracted with boiling ethanol. This gives 2-vinyl-anthraquinone as yellow needles, M.P.$_{inst}$=171°–172° C. Amount obtained: 28.8 parts (yield 48%).

EXAMPLE X

6-vinyl-1,2,3,4-tetrahydroanthraquinone (IIc)

The sublimated product is essentially pure 6-vinyl-1,2,3,4-tetrahydroanthraquinone (IIb), 70 parts potassium bisulphate and 5 parts hydroquinone is rapidly heated at 210° C., after which the pressure is lowered to 1–2 mm. Hg. The sublimated product is essentially pure 6-vinyl-1,2,3,4-tetrahydroanthraquinone. Recrystallization from 70/30 ethanol-benzene gives orange needles, M.P.$_{inst}$=157° C. Amount obtained: 70 parts (yield 75%).

TABLE

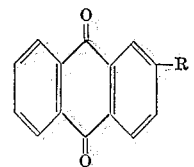

| | |
|---|---|
| (Ia) R = —CH$_2$—CH$_3$ | (Ib) R = —CH=CH$_2$ |
| (Ic) R = —CO—CH$_3$ | (Id) R = —CHOH—CH$_3$ |
| (Ie) R = —CHCl—CH$_3$ | (If) R = —CHBr—CH$_3$ |
| (Ig) R = —CH—CH$_3$ with N$^+$—Cl$^-$ pyridinium | (Ih) R = —CH—CH$_3$ with N$^+$—Br$^-$ pyridinium |
| (IIa) R = —CO—CH$_3$ | (IIIa) R = —CO—CH$_3$ |
| (IIb) R = —CHOH—CH$_3$ | (IIIb) R = —CHOH—CH$_3$ |
| (IIc) R = —CH=CH$_2$ | |

We claim:

1. A method for preparing 2-vinyl-anthraquinone comprises dehydrogenating 2-ethyl-anthraquinone vapour at high temperature, said vapour being mixed with an inert gas selected from the group consisting of nitrogen and carbon dioxide, through contact with a hydrogenation catalyst.

2. The method of claim 1 in which the hydrogenation catalyst is a precious metal selected from the group consisting of platinum and palladium.

3. 1-(2'-anthraquinonyl) ethyl pyridinium chloride of the formula

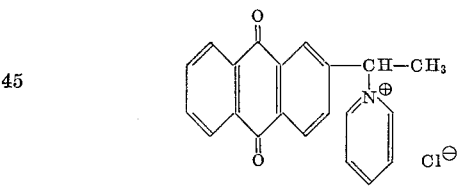

4. 1-(2'-anthraquinonyl) ethyl pyridinium bromide of the formula

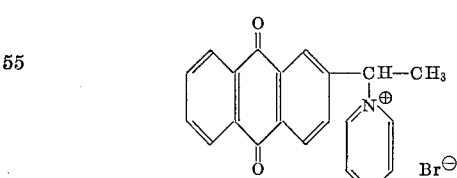

5. 6-(1'-hydroxyethyl) - 1,2,3,4 - tetrahydroanthraquinone of the formula

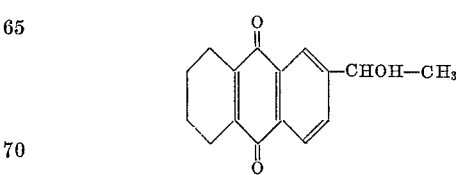

6. A method for preparing 2-(1'-hydroxyethyl) anthraquinone, which comprises: dehydrogenating 6(1'-hydroxyethyl)-1,2,3,4-tetrahydro-anthraquinone, dissolved in a solvent in the presence of a dehydrogenation catalyst.

7. A method for preparing 2-(1'-hydroxyethyl) anthraquinone which comprises: dissolving a monohalogen derivative of 2-ethyl-anthraquinone in a strongly polar solvent, and hydrolyzing same with an alkaline bicarbonate.

8. A method for preparing 6-(1'-hydroxyethyl)-1,2,3,4-tetrahydroanthraquinone which comprises: oxidizing 2-ethyl-anthraquinone with chromic acid and dissolving the 2-acetyl-anthraquinone so obtained in an inert solvent and completely hydrogenating the 2-acetyl-anthraquinone at room temperature and normal pressure, in the presence of a hydrogenation catalyst.

9. A method for preparing 6-acetyl-1,2,3,4-tetrahydroanthraquinone, which comprises hydrogenating 2-acetyl-anthraquinone at room temperature and normal pressure.

10. 6-vinyl-1,2,3,4 - tetrahydroanthraquinone of the formula

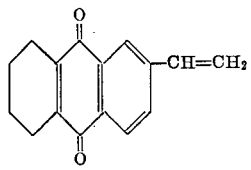

11. The method of claim 6 wherein the solvent is boiling ethylene glycol.

12. The method of claim 6 wherein the dehydrogenation catalyst is palladium on activated carbon.

References Cited by the Examiner

UNITED STATES PATENTS

| | | | |
|---|---|---|---|
| 1,687,903 | 10/1928 | Smith | 260—669 |
| 1,870,877 | 8/1932 | Smith | 260—669 |
| 1,870,878 | 8/1932 | Smith | 260—669 |
| 1,892,386 | 12/1932 | Dorough | 260—669 |
| 2,265,312 | 12/1941 | Quattlebaum et al. | 260—699 |
| 2,588,123 | 3/1952 | Kern | 260—669 |
| 2,780,649 | 2/1957 | Williams | 260—669 |
| 2,802,812 | 8/1957 | Overberger | 260—669 |
| 2,976,337 | 3/1961 | Christmann | 260—669 |

OTHER REFERENCES

Butz et al., J. Org. Chem., vol. 5, pp. 171–83 (1940).
Mowry et al., J.A.C.S., vol. 68, pp. 1105–12 (1946).

WALTER A. MODANCE, *Primary Examiner.*

NICHOLAS S. RIZZO, *Examiner.*